United States Patent
Hsu et al.

(10) Patent No.: US 9,824,043 B2
(45) Date of Patent: Nov. 21, 2017

(54) SYSTEM WITH SOLID STATE DRIVE AND CONTROL METHOD THEREOF

(71) Applicant: LITE-ON TECHNOLOGY CORPORATION, Taipei (TW)

(72) Inventors: Jen-Yu Hsu, Taipei (TW); Yi-Chiang Wang, Taipei (TW); Chia-Hua Liu, Taipei (TW); Chao-Ton Yang, Taipei (TW); Tsung-Ching Chang, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 233 days.

(21) Appl. No.: 14/799,052

(22) Filed: Jul. 14, 2015

(65) Prior Publication Data

US 2016/0217089 A1 Jul. 28, 2016

Related U.S. Application Data

(60) Provisional application No. 62/106,280, filed on Jan. 22, 2015.

(30) Foreign Application Priority Data

May 20, 2015 (CN) .......................... 2015 1 0259004

(51) Int. Cl.
*G06F 3/00* (2006.01)
*G06F 13/28* (2006.01)
*G06F 13/10* (2006.01)
*G06F 12/10* (2016.01)
*G06F 3/06* (2006.01)

(52) U.S. Cl.
CPC .............. *G06F 13/28* (2013.01); *G06F 12/10* (2013.01); *G06F 13/102* (2013.01); *G06F 3/0661* (2013.01)

(58) Field of Classification Search
CPC ............................... G06F 12/10; G06F 3/0661
See application file for complete search history.

(56) References Cited

U.S. PATENT DOCUMENTS

2013/0191590 A1* 7/2013 Malwankar .......... G06F 3/0611
711/114

* cited by examiner

*Primary Examiner* — Zachary K Huson
(74) *Attorney, Agent, or Firm* — WPAT, PC

(57) ABSTRACT

A system includes a host device, an external bus and a storage device. A driver is installed in the host device. The external bus is connected with the host device. The external bus supports a communication protocol. The storage device includes a controlling circuit and a non-volatile memory. After the storage device issues a request to the host device according to the communication protocol, a reserved space is created in a host memory of the host device in response to the request, and a device information from the storage device is stored into the reserved space. While the host device issues a first command to operate the storage device, the first command is converted into a second command by the driver according to the device information, and then the second command is transmitted to the storage device.

17 Claims, 5 Drawing Sheets

SYSTEM WITH SOLID STATE DRIVE AND CONTROL METHOD THEREOF

This application claims the benefit of U.S. Patent Provisional Application No. 62/106,280, filed Jan. 22, 2015 and People's Republic of China Patent Application No. 201510259004.6, filed May 20, 2015, the subject matters of which are incorporated herein by reference.

FIELD OF THE INVENTION

The present invention relates to a system and a control method thereof, and more particularly to a system with a solid state drive and a control method thereof.

BACKGROUND OF THE INVENTION

As is well known, a solid state drive (SSD) is a data storage device that uses a non-volatile memory as main storage elements to store data. After data are written to the non-volatile memory, if no power is supplied to the system, the data are still retained in the solid state drive.

FIG. 1 is a schematic functional block diagram illustrating a system with a solid state drive according to the prior art. As shown in FIG. 1, the system 100 comprises a solid state drive 10 and a host device 12. The solid state drive 10 is used for storing data. The host device 12 is in communication with the solid state drive 10. The solid state drive 10 comprises a controlling circuit 101, a cache memory 107 and a non-volatile memory 105. The controlling circuit 101 is in communication with the host device 12 through an external bus 20. Consequently, commands and data can be exchanged between the controlling circuit 101 and the host device 12. Generally, the external bus 20 is a USB bus, an SATA bus, a PCIe bus, or the like. The cache memory 107 is for example a volatile memory such as a dynamic random access memory (DRAM). For example, the storage capacity of the cache memory 107 is 4 M byte or 8 M byte.

Generally, the cache memory 107 is a data buffer for temporarily storing the write data which is inputted through the host device 12 or temporarily storing the read data which is outputted from the non-volatile memory 105. In case that the host device 12 intends to store the write data into the non-volatile memory 105, the write data received through the external bus 20 is temporarily stored into the cache memory 107 by the controlling circuit 101, and then the write data is transmitted from the cache memory 107 to the non-volatile memory 105 by the controlling circuit 101. Similarly, in case that the host device 12 intends to read the read data from the non-volatile memory 105, the read data from the non-volatile memory 105 is temporarily stored into the cache memory 107 by the controlling circuit 101, and then the read data is transmitted from the cache memory 107 to the host device 12 by the controlling circuit 101.

Another function of the cache memory 107 is to store a flash translation layer table (FTL table). In the solid state drive 10, the controlling circuit 101 can quickly access the data of the non-volatile memory 105 through the FTL table. The function of the non-volatile memory 105 will be illustrated in more details as follows.

Generally, the host device 12 defines the data addresses of the solid state drive 10 through logical block addresses (LBAs). Moreover, the non-volatile memory 105 defines the data addresses of the non-volatile memory 105 through physical allocation addresses (PAAs). Consequently, the solid state drive 10 should have a FTL table for performing data address mapping. The FTL table is stored in the cache memory 107.

For example, when a write command or a read command issued from the host device 12 is received by the controlling circuit 101, a LBA is also issued from the host device 12 to indicate the address of the data to be read or written. After the LBA is received by the controlling circuit 101, the LBA has to be mapped to the corresponding PAA through the FTL table. That is, the LBA is converted into the corresponding PAA by the controlling circuit 101 according to the FTL table. Consequently, the PAA to be read from or written into the non-volatile memory 105 can be realized, and the write data is stored into the corresponding PAA of the non-volatile memory 105 or the read data is read from the corresponding PAA of the non-volatile memory 105.

Generally, in case that electric power is normally supplied to the solid state drive 10, the FTL table is stored in the cache memory 107, so that the corresponding PAA can be quickly read, stored and updated. Before the electric power supplied to the solid state drive 10 is stopped, the FTL table is written to the non-volatile memory 105 by the controlling circuit 101. After the electric power is no longer supplied to the solid state drive 10, the FTL table stored in the cache memory 107 is deleted.

As mentioned above, the FTL table has been written to the non-volatile memory 105 before the electric power supplied to the solid state drive 10 is stopped. Consequently, when the solid state drive 10 is powered by the electric power again, the FTL table in the non-volatile memory 105 is stored into the cache memory 107 again by the controlling circuit 101. Accordingly, the solid state drive 10 can be normally operated. However, the above architecture is not cost-effective.

Therefore, there is a need of simplifying the solid state drive so as to reduce the fabricating cost.

SUMMARY OF THE INVENTION

An embodiment of the present invention provides a system. The system includes a host device, an external bus and a storage device. The host device includes a host memory. A driver is installed in the host device. The external bus is connected with the host device. The external bus supports a communication protocol. The storage device includes a controlling circuit and a non-volatile memory. The controlling circuit is connected with the external bus. The non-volatile memory is connected with the controlling circuit through an internal bus. After the storage device issues a request to the host device according to the communication protocol, a reserved space is created in the host memory in response to the request, and a device information from the storage device is stored into the reserved space. While the host device issues a first command to operate the storage device, the first command is converted into a second command by the driver according to the device information, and then the second command is transmitted to the storage device.

Another embodiment of the present invention provides a control method for a host device of a system. A storage device of the system is in communication with the host device through an external bus. The control method includes the following steps. Firstly, a request from the storage device is received according to a communication protocol supported by the external bus, and a reserved space is created in a host memory of the host device in response to the request. Then, a device information from the storage device is received, and the device information is stored into the reserved space. While the host device issues a first command to operate the storage device, the first command is converted into a second command by a driver according to the device information, and then the second command is transmitted to the storage device.

A further embodiment of the present invention provides a control method for a storage device of a system. A host device of the system is in communication with the storage device through an external bus. The control method includes the following steps. Firstly, a request is issued to the host device according to a communication protocol supported by the external bus, so that a reserved space is created in a host memory of the host device. Then, a device information is stored into the reserved space of the host memory. After a first command is converted into a second command by a driver of the host device according to the device information, the storage device receives the second command.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a system with a solid state drive and a control method thereof. For effectively reducing cost, the solid state drive of the present invention is not equipped with a cache memory. Moreover, the control method of the present invention cooperates with a host memory of the host device in order to operate the solid state drive. The system and the control method of the present invention will be illustrated in more details as follows.

Figure 1:
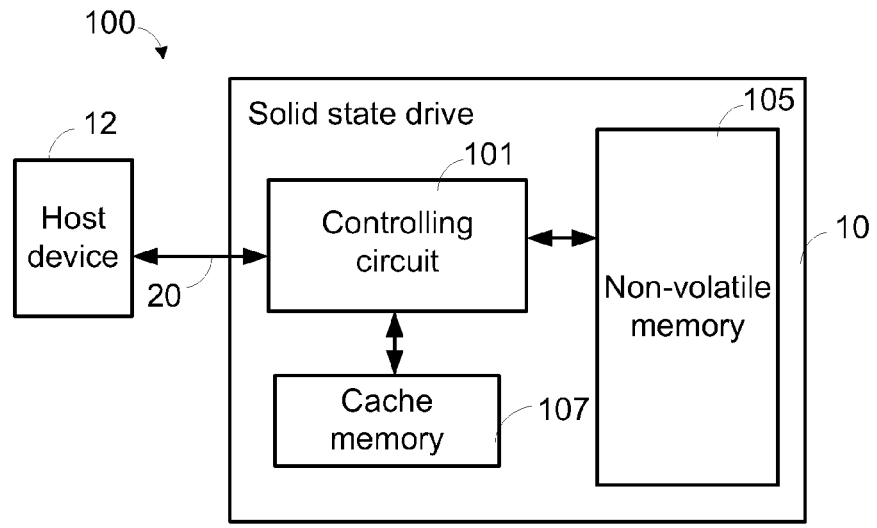
FIG. 1 (prior art) is a schematic functional block diagram illustrating a system with a solid state drive according to the prior art.
Figure 2:
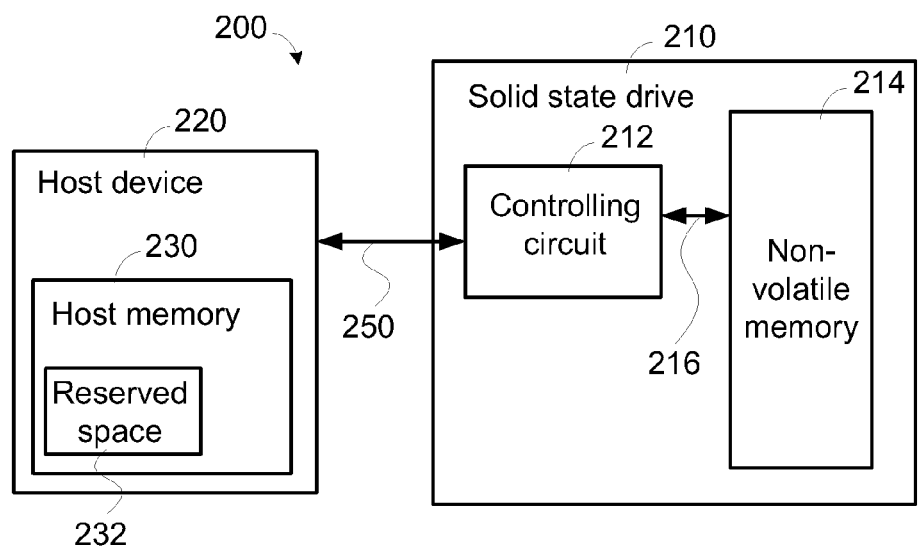
FIG. 2 is a schematic functional block diagram illustrating a system with a solid state drive according to a first embodiment of the present invention.

FIG. 2 is a schematic functional block diagram illustrating a system with a solid state drive according to a first embodiment of the present invention. As shown in FIG. 2, the system 200 comprises a host device 220 and a solid state drive 210. The host device 220 and the solid state drive 210 are in communication with each other through an external bus 250. For example, the host device 220 is a computer host, and the external bus 250 is a SATA bus or a PCIe bus.

The solid state drive 210 comprises a controlling circuit 212 and a non-volatile memory 214. Moreover, the controlling circuit 212 and the non-volatile memory 214 are in communication with each other through an internal bus 216. Moreover, commands and data can be exchanged between the controlling circuit 212 and the host device 220 through the external bus 250.

In this embodiment, the external bus 250 can support a specified communication protocol. According to the specified communication protocol, a reserved space 232 is created in a host memory 230 of the host device 220 in response to a request from the solid state drive 210. Moreover, the solid state drive 210 can directly control the reserved space 232 of the host memory 230 according to the specified communication protocol. For example, the specified communication protocol is an advanced host controller interface (AHCI) protocol or a non-volatile memory express (NVMe) protocol.

In other words, the controlling circuit 212 of the solid state drive 210 may issue a request to the host device 220 according to the specified communication protocol supported by the external bus 250. In response to the request, the reserved space 232 is created in the host memory 230 of the host device 220 so as to be used by the solid state drive 210. Consequently, the reserved space 232 can be accessed by the controlling circuit 212.

After the right to use the reserved space 232 is acquired by the solid state drive 210, a device information is transmitted from the controlling circuit 212 to the reserved space 232 and stored into the reserved space 232. The device information contains information for executing operations of the solid state drive 210. For example, the device information includes the FTL table, a garbage collection update table, a storage block state, and so on. Take for example that the device information is the FTL table. After the FTL table is stored into the reserved space 232 by the controlling circuit 212, if a read/write command from the host device 220 is received by the controlling circuit 212, the FTL table in the reserved space 232 can be accessed by the controlling circuit 212 to convert the LBA into the PAA. Consequently, after the LBA contained in the read/write command is converted into the corresponding PAA, the controlling circuit 212 can perform the corresponding data reading/wiring operation on the non-volatile memory 214.

Figure 3:
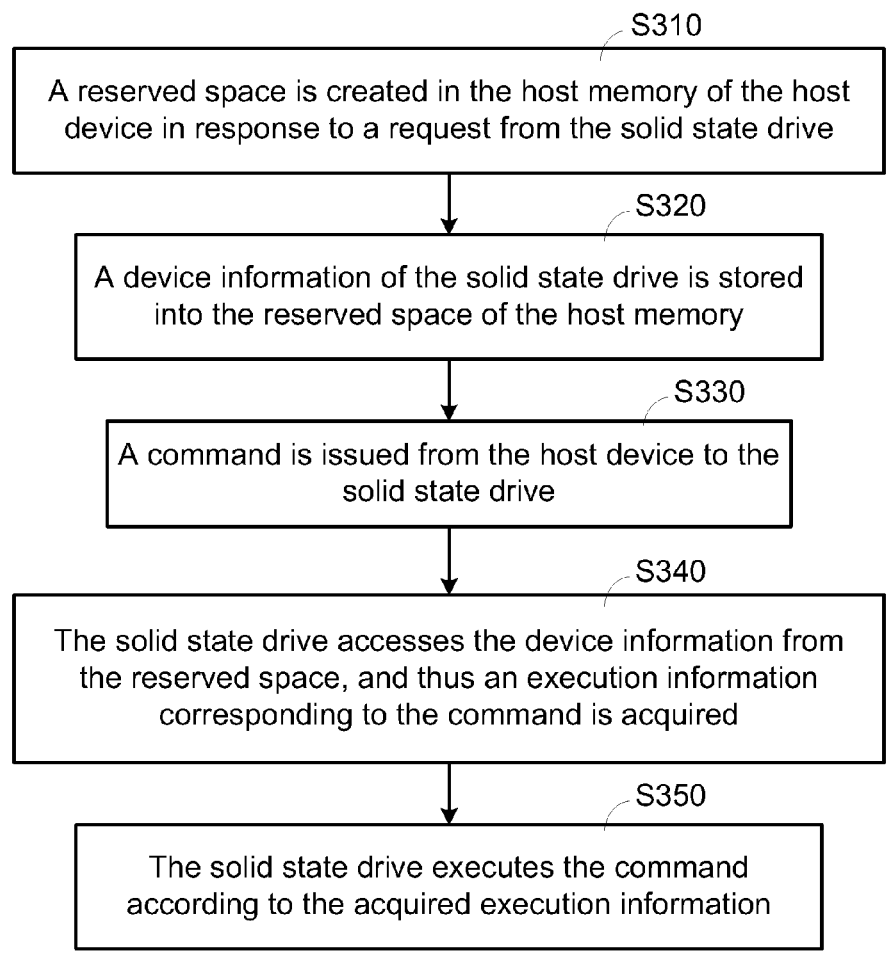
FIG. 3 is a flowchart illustrating a control method for the system according to the first embodiment of the present invention.

FIG. 3 is a flowchart illustrating a control method for the system according to the first embodiment of the present invention. Firstly, the solid state drive 210 issues a request. In response to the request, a reserved space 232 is created in the host memory 230 of the host device 220 (Step S310). Then, a device information of the solid state drive 210 is stored into the reserved space 232 of the host memory 230 (Step S320). Then, a command is issued from the host device 220 to the solid state drive 210 (Step S330). Then, the solid state drive 210 accesses the device information from the reserved space 232 so as to acquire an execution information corresponding to the command (Step S340). Then, the solid state drive 210 executes the command according to the acquired execution information (Step S350).

In the step S310, the controlling circuit 212 of the solid state drive 210 issues the request to the host device 220 according to the specified communication protocol supported by the external bus 250. In response to the request, the reserved space 232 is created in the host memory 230 of the host device 220. After the reserved space 232 is created in the host memory 230 of the host device 220, the device information (e.g., the FTL table, the garbage collection update table, or the storage block state) for executing a required operation is transmitted from the solid state drive 210 to the host device 220 and stored into the reserved space 232 of the host memory 230 (Step S320). Hereinafter, the device information is illustrated by referring to the FTL table, and the command issued from the host device 220 is illustrated by referring to a read/write command.

After the reserved space 232 is created in the host memory 230 of the host device 220, the FTL table is transmitted from the solid state drive 210 to the host device 220 by the controlling circuit 212 and stored into the reserved space 232 of the host memory 230 (Step S320). Then, in the step S330, the host device 220 issues a read/write command to the solid state drive 210. In this embodiment, when the read/write command is issued from the host device 220, the LBA is also issued from the host device 220 to indicate the address of the data to be read or written.

After the LBA along with the read/write command is received by the controlling circuit 212, the FTL table in the reserved space 232 of the host memory 230 is accessed by the controlling circuit 212 through the external bus 250 (Step S340). Consequently, the corresponding PAA mapped from the LBA is acquired. In this embodiment, after the solid state drive 210 accesses the device information from the reserved space 232, the acquired execution information corresponding to the command is the PAA mapped from the LBA. After the PAA is acquired by the controlling circuit 212, the solid state drive 210 executes the read/write command according to the acquired PAA (Step S350). In particular, according to the PAA, the controlling circuit 212 stores the write data into the corresponding address of the non-volatile memory 214 or read the read data from the corresponding address of the non-volatile memory 214.

From the above descriptions, the solid state drive can request a reserved space in the host memory of the host device, and access the information from the reserved space through the external bus. In other words, even if the solid state drive is not equipped with the cache memory, the solid state drive can be normally operated. Under this circumstance, the fabricating cost of the solid state drive is reduced. In the above embodiment, the solid state drive can access the information from the reserved space through the external bus. For further simplifying the data transmission process and enhancing the system performance, the present invention further provides another embodiment.

Figure 4A:
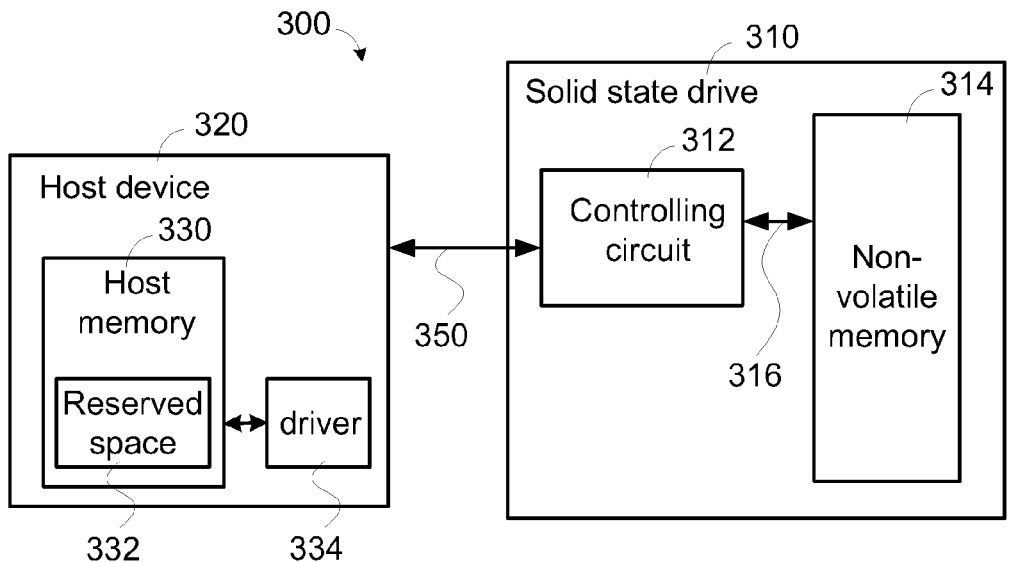
FIG. 4A is a schematic functional block diagram illustrating a system with a solid state drive according to a second embodiment of the present invention.

In the system of the second embodiment, the host device further comprises a driver for accessing the reserved space of the host memory and converting the command. FIG. 4A is a schematic functional block diagram illustrating a system with a solid state drive according to a second embodiment of the present invention. As shown in FIG. 4A, the system 300 comprises a host device 320 and a solid state drive 310. The host device 320 and the solid state drive 310 are in communication with each other through an external bus 350. The solid state drive 310 comprises a controlling circuit 312 and a non-volatile memory 314. Moreover, the controlling circuit 312 and the non-volatile memory 314 are in communication with each other through an internal bus 316. Moreover, commands and data can be exchanged between the controlling circuit 312 and the host device 320 through the external bus 350.

Moreover, the external bus 350 can support a specified communication protocol. According to the specified communication protocol, a reserved space 332 is created in a host memory 330 of the host device 320 in response to a request from the solid state drive 310. For example, the external bus 350 is a SATA bus or a PCIe bus, and the specified communication protocol is an advanced host controller interface (AHCI) protocol or a non-volatile memory express (NVMe) protocol.

In this embodiment, the host device 320 further comprises a driver 334 for accessing the reserved space 332 of the host memory 330 and performing command conversion. In an embodiment, the driver 334 is previously installed in the host device 320. In another embodiment, the driver 334 is installed in the host device 320 when the solid state drive 310 is in communication with the host device 320.

In the system 300, the controlling circuit 312 of the solid state drive 310 may issue a request to the host device 320 according to the specified communication protocol supported by the external bus 350. In response to the request, the reserved space 332 is created in the host memory 330 of the host device 320 to be used by the solid state drive 310. Consequently, the reserved space 332 can be accessed by the controlling circuit 312.

After the right to use the reserved space 332 is acquired by the solid state drive 310, a device information is transmitted from the controlling circuit 312 to the reserved space 332 and stored into the reserved space 332. The device information contains information for executing operations of the solid state drive 30. For example, the device information contains the FTL table, a garbage collection update table, a storage block state, and so on. While the host device 320 issues a command to the solid state drive 310, the device information in the reserved space 332 is accessed by the driver 334, and thus an execution information corresponding to the command is acquired. Then, the driver 334 converts the command by adding the execution information to the command, and a new command is generated and transmitted to the solid state drive 310.

Take for example that the device information is the FTL table, and the command issued from the host device 320 is a read/write command. After the FTL table is stored into the reserved space 332 by the controlling circuit 312, if the host device 320 issues a read/write command, the FTL table in the reserved space 332 can be accessed by the driver 334. According to the LBA contained in the read/write command and the FTL table, the mapped PAA is acquired. In this case, the PAA is an execution information corresponding to the command. Then, the mapped PAA is added to the read/write command by the driver 334, and thus a new read/write command is generated and transmitted to the solid state drive 310. After the new read/write command from the host device 320 is received by the controlling circuit 312, the mapped PAA is directly acquired from the new read/write command by the controlling circuit 312. According to the mapped PAA, the controlling circuit 312 can perform the corresponding data reading/writing operation on the non-volatile memory 314. Under this circumstance, the controlling circuit 312 does not to access the FTL table of the reserved space 332 to perform the address mapping through the external bus 350. In this embodiment, the read/write command includes a read command or a write command.

Figure 4B:
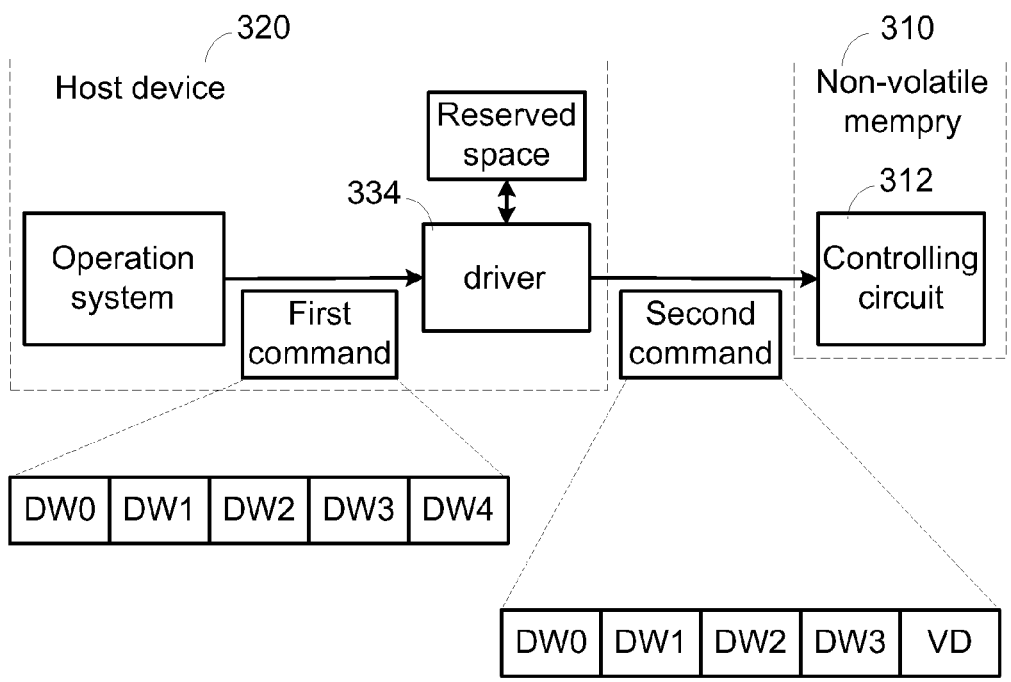
FIG. 4B schematically illustrates a command conversion process performed by the driver.

FIG. 4B schematically illustrates a command conversion process performed by the driver. For example, in case that the communication protocol is an AHCI protocol, each command has a length equal to five double words DW0~DW4 (i.e., 5×32 bytes). The last double word DW4 is a reserved double word. In this embodiment, after the device information in the reserved space 332 is accessed by the driver 334, an execution information VD is acquired and added to the reserved double word DW4. Consequently, a new command is generated.

In this embodiment, while an operating system of the host device 320 issues a first command to operate the solid state drive 310, the driver 334 will firstly process the first command. In this embodiment, the device information in the reserved space 332 is accessed by the driver 334 according to the first command, and an execution information VD corresponding to the first command is acquired. In other words, the first command is not directly transmitted to the solid state drive 310.

Take for example that the FTL table is the device information. After the LBA contained in the first command is retrieved and the FTL table in the reserved space 332 is accessed by the driver 334, the PAA as the execution information VD corresponding to the first command is acquired. Then, the execution information VD is added to the double word DW4 of the first command by the driver 334, so that the second command is generated. The second command is transmitted to the controlling circuit 312 of the solid state drive 310. In other words, after the PAA of the FTL table is added to the double word DW4 of the first command by the driver 334, the second command is generated.

In this embodiment, the second command contains the first command and the execution information VD. In case that the communication protocol is the AHCI protocol, the contents of the double words DW0~DW3 in the second command are identical to the contents of the double words DW0~DW3 in the first command, and the execution information VD is added to the reserved double word DW4 of the second command.

Since the second command contains the execution information VD, after the second command is received by the controlling circuit 312 of the solid state drive 310, the controlling circuit 312 can directly acquire the execution information VD from the second command and execute the second command according to the execution information VD. For example, in case that the device information is the FTL table, the controlling circuit 312 can directly acquire the PAA as the execution information VD from the second command and directly execute the read/write command. Consequently, the controlling circuit 312 stores the write data into the corresponding address of the non-volatile memory 314 or read the read data from the corresponding address of the non-volatile memory 314.

In the system 300 of the second embodiment, the reserved space 332 of the host memory 330 is accessed by the driver 334, which is installed in the host device 320. Consequently, the frequency of accessing the host device 320 by the solid state drive 310 through the external bus 350 is effectively reduced. Under this circumstance, the performance of the system 300 is enhanced.

Figure 5:
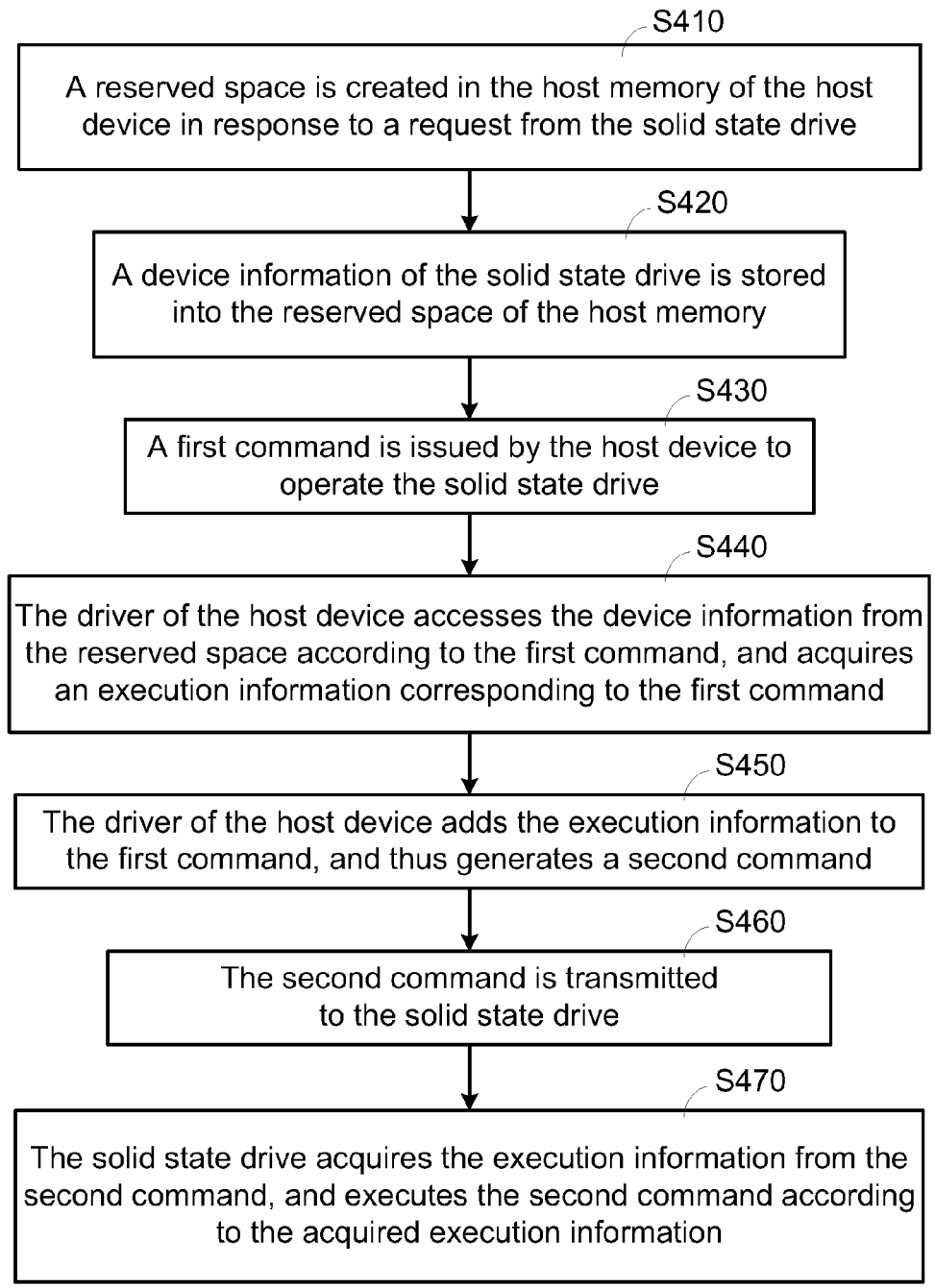
FIG. 5 is a flowchart illustrating a control method for the system according to the second embodiment of the present invention.

FIG. 5 is a flowchart illustrating a control method for the system according to the second embodiment of the present invention. Firstly, the solid state drive 310 issues a request. In response to the request, a reserved space 332 is created in the host memory 330 of the host device 320 (Step S410). Then, a device information of the solid state drive 310 is stored into the reserved space 332 of the host memory 330 (Step S420). Then, a first command is issued by the host device 320 to operate the solid state drive 310 (Step S430). Then, the driver 334 of the host device 320 accesses the device information from the reserved space 332 according to the first command, and acquires an execution information corresponding to the first command (Step S440). Then, the driver 334 of the host device 320 adds the execution information to the first command, so that a second command is generated (Step S450). Then, the second command is transmitted to the solid state drive 310 (Step S460). Then, the solid state drive 310 acquires the execution information from the second command, and executes the second command according to the acquired execution information (Step S470).

Please also refer to FIG. 4B. The first command contains plural double words, wherein at least one of the plural double words is a reserved double word. After the execution information VD is added to the reserved double word of the first command by the driver 334, the second command is generated. In other words, the second command contains the first command and the execution information VD.

For example, the first command is a read command, and the read command contains a LBA. The second command contains the read command and an execution information. After the FTL table in the reserved space is accessed by the driver 334, the LBA is converted into the corresponding PAA by the driver 334. Moreover, the execution information contains the corresponding PAA.

Figure 6:
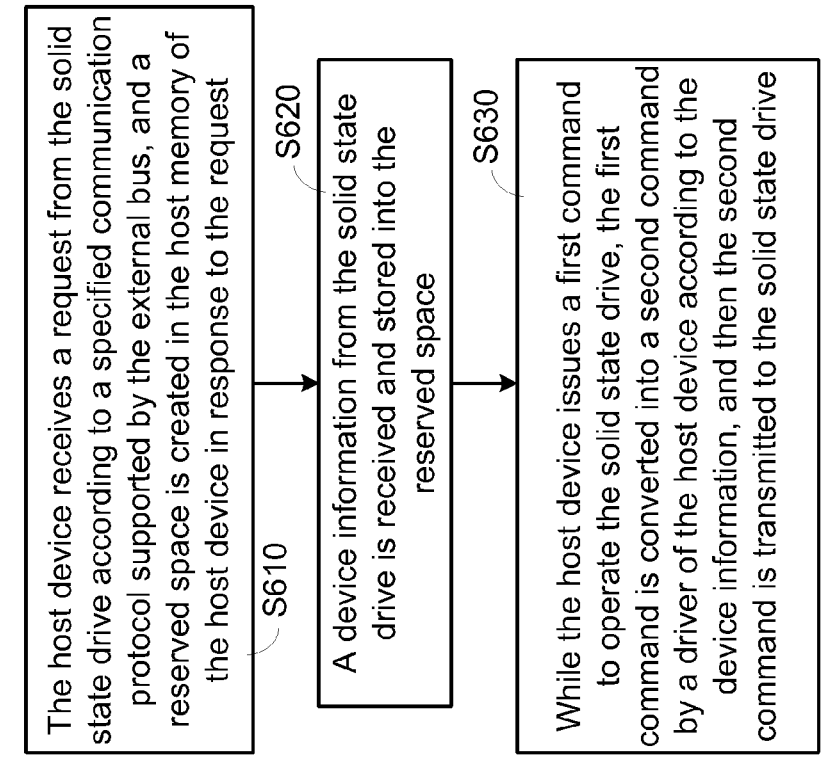
FIG. 6 is a flowchart illustrating a control method for the host device of the system according to the second embodiment of the present invention.

FIG. 6 is a flowchart illustrating a control method for the host device of the system according to the second embodiment of the present invention. Firstly, the host device 320 receives a request from the solid state drive 310 according to a specified communication protocol supported by the external bus 350. In response to the request, a reserved space 332 is created in the host memory 330 of the host device 320 (Step S610). Then, a device information from the solid state drive 310 is received by the host device 320, and stored into the reserved space 332 (Step S620). While the host device 320 issues a first command to operate the solid state drive 310, the first command is converted into a second command by a driver 334 of the host device 320 according to the device information, and then the second command is transmitted to the solid state drive 310 (Step S630). The details of the above steps are similar to those mentioned above, and are not redundantly described herein.

Figure 7:
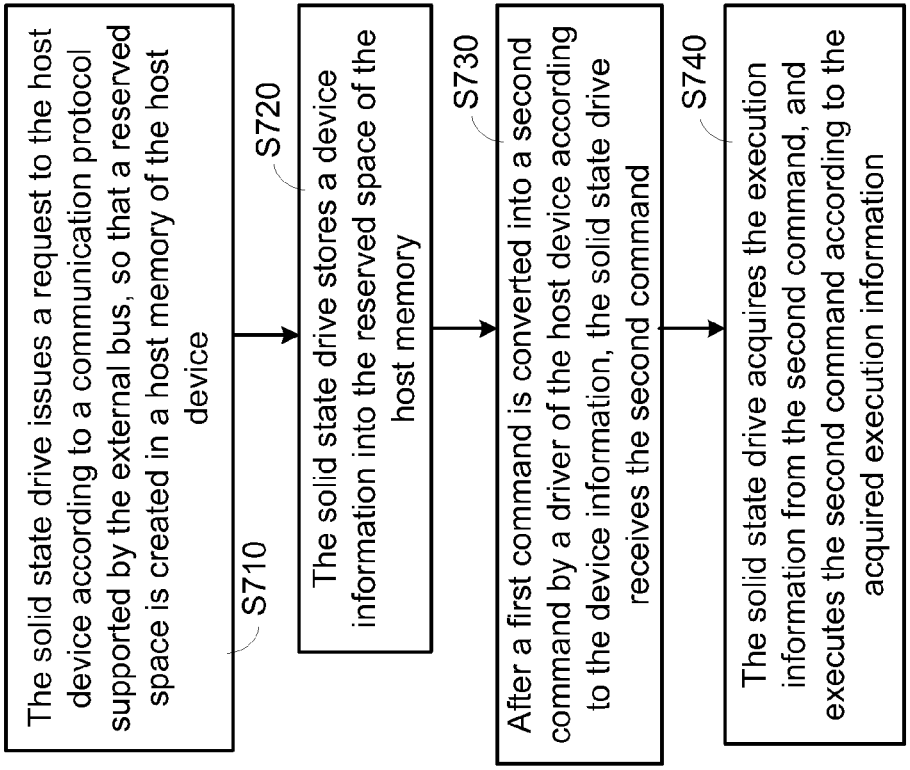
FIG. 7 is a flowchart illustrating a control method for the solid state drive of the system according to the second embodiment of the present invention.

FIG. 7 is a flowchart illustrating a control method for the solid state drive of the system according to the second embodiment of the present invention. Firstly, the solid state drive 310 issues a request to the host device 320 according to a communication protocol supported by the external bus 350, so that a reserved space 332 is created in a host memory 330 of the host device 320 (Step S710). Then, the solid state drive 310 stores a device information into the reserved space 332 of the host memory 330 (Step S720). After a first command is converted into a second command by a driver of the host device 320 according to the device information, the solid state drive 310 receives the second command (Step S730). Then, the solid state drive 310 acquires the execution information from the second command, and executes the second command according to the acquired execution information (Step S740). The details of the above steps are similar to those mentioned above, and are not redundantly described herein.

It is noted that the execution information VD is not restricted to PAA. In some embodiments, the driver 334 of the host device 320 can calculate the input/output operation per second (IOPS) of the data transmission between the host device 320 and the solid state drive 310. After the IOPS is calculated by the driver 334, the IOPS is contained in the execution information VD. Consequently, the IOPS is transmitted to the solid state drive 310 along with the second command.

From the above descriptions, the present invention provides a system with a solid state drive and a control method thereof. Since the solid state drive of the system of the present invention is not equipped with a cache memory, the fabricating cost is reduced. Moreover, by the control method of the present invention, the read/write efficiency of the solid state drive is satisfied.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A system, comprising:
    a host device comprising a host memory, wherein a driver is installed in the host device;
    an external bus connected with the host device, wherein the external bus supports a communication protocol; and
    a storage device comprising a controlling circuit and a non-volatile memory, wherein the controlling circuit is connected with the external bus, and the non-volatile memory is connected with the controlling circuit through an internal bus,
    wherein after the storage device issues a request to the host device according to the communication protocol, a reserved space is created in the host memory in response to the request, and a device information from the storage device is stored into the reserved space, wherein while the host device issues a first command to operate the storage device, the first command is converted into a second command by the driver according to the device information, and then the second command is transmitted to the storage device.

2. The system as claimed in claim 1, wherein the driver accesses the device information in the reserved space according to the first command and acquires an execution information, and then, the driver converts the first command into the second command by adding the execution information to the first command.

3. The system as claimed in claim 1, wherein the second command contains the first command and an execution information, wherein the driver accesses the device information in the reserved space according to the first command and acquires the execution information.

4. The system as claimed in claim 1, wherein the external bus is a SATA bus or a PCIe bus, and the communication protocol is an advanced host controller interface (AHCI) protocol or a non-volatile memory express (NVMe) protocol.

5. The system as claimed in claim 1, wherein the device information includes a flash translation layer table, a garbage collection update table or a storage block state.

6. The system as claimed in claim 1, wherein the first command contains plural double words, and at least one of the plural double words is a reserved double word, wherein the first command is converted into the second command by adding an execution information to the reserved double word of the first command by the driver.

7. The system as claimed in claim 6, wherein the first command contains a logical block address, and the execution information contains a physical allocation address, wherein the physical allocation address is acquired by mapping the logical block address according to a flash translation layer table, wherein the flash translation layer table is stored in the reserved space of the host memory.

8. A control method for a host device of a system, a storage device of the system being in communication with the host device through an external bus, the control method comprising steps of:
    receiving a request from the storage device according to a communication protocol supported by the external bus, and creating a reserved space in a host memory of the host device in response to the request; and
    receiving a device information from the storage device, and storing the device information into the reserved space,
    wherein while the host device issues a first command to operate the storage device, the first command is converted into a second command by a driver according to the device information, and then the second command is transmitted to the storage device.

9. The control method as claimed in claim 8, wherein the device information in the reserved space is accessed by the driver to acquire an execution information, wherein the execution information is added to the first command by the driver to generate the second command.

10. The control method as claimed in claim 8, wherein the second command contains the first command and an execution information, wherein the device information in the reserved space is accessed by the driver to acquire the execution information.

11. The control method as claimed in claim 8, wherein the external bus is a SATA bus or a PCIe bus, and the communication protocol is an advanced host controller interface (AHCI) protocol or a non-volatile memory express (NVMe) protocol.

12. The control method as claimed in claim 8, wherein the device information includes a flash translation layer table, a garbage collection update table or a storage block state.

13. A control method for a storage device of a system, a host device of the system being in communication with the storage device through an external bus, the control method comprising steps of:
    issuing a request to the host device according to a communication protocol supported by the external bus, so that a reserved space is created in a host memory of the host device; and
    storing a device information into the reserved space of the host memory,
    wherein after a first command is converted into a second command by a driver of the host device according to the device information, the storage device receives the second command.

14. The control method as claimed in claim 13, wherein the storage device acquires an execution information from the second command, and the storage device executes the second command according to the execution information.

15. The control method as claimed in claim 13, wherein the second command contains the first command and an execution information, wherein the device information in the reserved space is accessed by the driver to acquire the execution information.

16. The control method as claimed in claim 13, wherein the external bus is a SATA bus or a PCIe bus, and the communication protocol is an advanced host controller interface (AHCI) protocol or a non-volatile memory express (NVMe) protocol.

17. The control method as claimed in claim 13, wherein the device information includes a flash translation layer table, a garbage collection update table or a storage block state.

\* \* \* \* \*